May 12, 1931.　　　F. W. ELLYSON　　　1,804,921
ROTARY VALVE GEAR
Filed Dec. 4, 1925
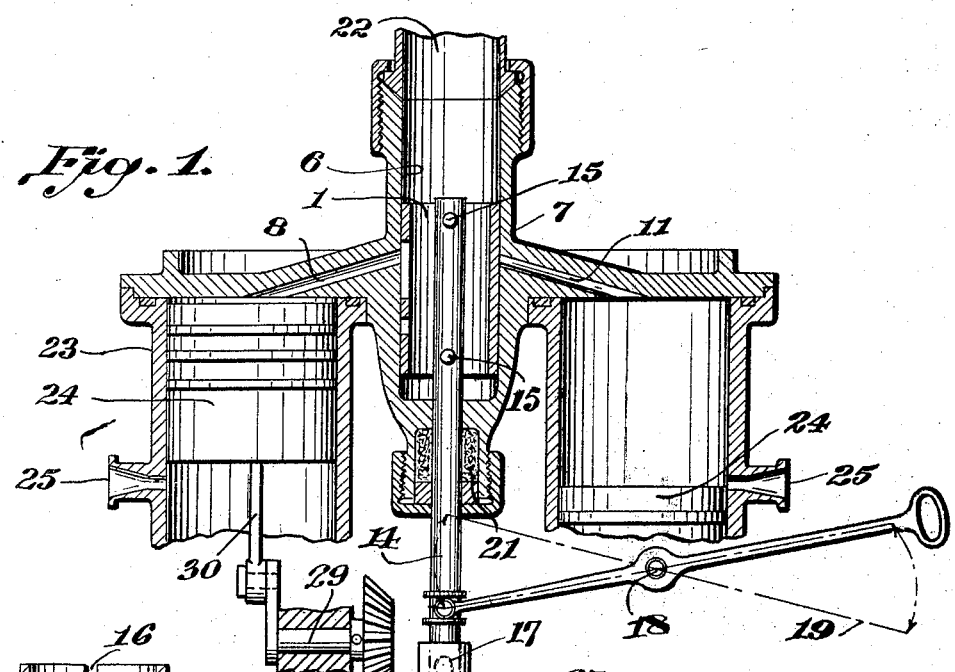
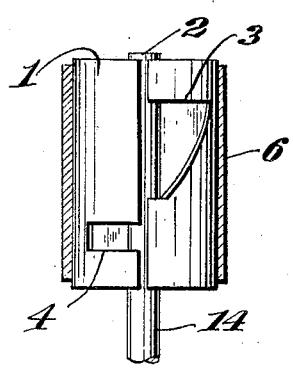
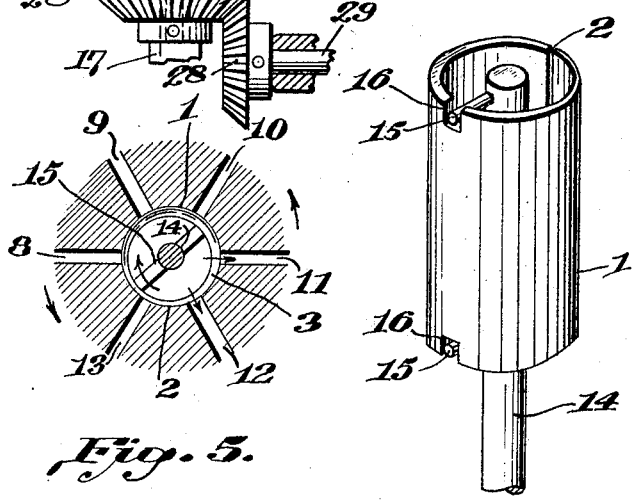
Inventor:
Frederick Washington Ellyson.
by　　　　　　　　　
Attorney Patented May 12, 1931

1,804,921

UNITED STATES PATENT OFFICE

FREDERICK WASHINGTON ELLYSON, OF MUNICH, GERMANY

ROTARY VALVE GEAR

Application filed December 4, 1925, Serial No. 73,100, and in Germany April 14, 1925.

This invention relates to a rotary slide valve gear, especially for multi-cylinder engines and the like in which the pressure of the driving fluid (steam or compressed air or the like) is utilized for packing the slide valve body with regard to its seat.

Rotary slide valve gears in which steam pressure is used for packing the slide valve to the valve seat are known as Corliss type valves. Slide valves of this type have a rigid cylindrical valve body which is shiftably mounted on a prismatic driving rod in such a manner that it is pressed one-sided by the steam pressure away from the rod in radial direction, on its seat so that it comes in contact with the seat along a straight line which corresponds to the height of the slide valve and which forms the packing line. Owing to this linear contact these slide valves are not suitable for multi-cylinder engines where for each cylinder one such slide valve must be provided for the admission of the driving fluid and one for the exhaust of the driving fluid.

According to this invention it is possible to use a single rotary slide valve for the admission of the driving fluid to any number of cylinders and further to attain a better and more durable joint between the slide and the seat, the construction of the gear being generally simplified and made cheaper.

In the slide valve according to the invention the principle of the linear contact is abandoned and the entire surface of the valve cylinder is used for the joint. The valve body consists of a hollow cylinder and is capable of a spring like action radially in outward direction owing to the arrangement that the valve body is of unequal thickness in cross section and slit in longitudinal direction at the point where the material is of the thinnest cross section. In principle the operation of this slide valve cylinder is best explained if it is considered as a piston ring which, in relation to its diameter, is very high and which is loaded by the driving fluid from the inside. The valve member replaces in this case the piston body and communicates its rotating movement to the slide valve leaving to the driving fluid sufficient space for exerting its pressure effect upon the inner wall of the hollow valve, so that the walls of the hollow valve are pressed outward upon the valve seat by the driving fluid as well as by the radial elasticity of the valve.

An embodiment of the invention is shown, by way of example, on the accompanying drawing, in which Fig. 1 shows in vertical section two cylinders having a common cover plate, the improved slide valve gear for a two- or multi-cylinder engine being built in.

Fig. 2 shows in longitudinal section on larger scale the slide valve body.

Fig. 3 is an elevation of Fig. 2.

Fig. 4 shows in perspective view the slide valve.

Fig. 5 is a horizontal section of the cover plate shown in Fig. 1, the section being taken at the points where the steam distributing channels terminate in the slide valve seat, the operation of the new gear being thus illustrated.

In the form of construction shown six steam admission channels are supposed for the same number of cylinders 23 to be controlled by the slide valve gear.

The slide valve proper consists of a hollow cylinder made from cast iron or the like, said hollow cylinder being cast or turned out eccentrically, as can be seen from Fig. 5, in such a manner that its wall gets thinner towards one side. At the point where the wall is thinnest, which is opposite the point at which the wall is thickest, a slit 2 as sharp and as narrow as possible is cut through the cylinder from top to bottom and parallel to the cylinder-axis in order to make the valve body elastic radially in outward direction similar to a slit piston ring. At the right and left of this slit 2 the distributing passages are cut into the wall of the slide valve body as shown in Fig. 3. The upper trapezoidal passage 3 is the inlet port when driving forwards, and the lower rectangular passage 4 extending inward on the other side of the slit from the passage 3 serves as admission port when the engine is going in reverse direction or backwards. In order to assist the elastic action of the rotary slide valve and the tight pressing on the valve seat special elastic rings 5 may be arranged between said passages.

The slide valve body is in tight touch with the cylindrical seat 6 owing to its radial elasticity said seat being preferably mounted on a pipe 22 directly connected with the pipe for the fresh driving fluid channels 8—13 (Fig. 5) for the steam admission branching off from said valve pipe. The channels 8—13 are preferably cast in one piece with the pipe 7 and the cylinder cover or pressed in one piece with the same as shown in Fig. 1.

The slide valve is rotated from the engine through the intermediary of the driving rod 14 having two or more catch pins 15 engaging with incisions 16 in the upper and lower edges of the valve body at suitable points.

The action of the weight of the slide valve body is intercepted for the greatest part by the valve seat against which the valve body is pressed. The catch pins 15 can therefore be less strong than usual as they have to produce only the rotating movement. The driving rod 14 is mounted on the shaft 17 driven from the engine in any suitable way as by means of a bevelled gear 27 keyed to the shaft 17 and meshing with gears 28 upon crankshafts 29 that are operatively connected to the pistons 24 by suitable connecting rods 30. The driving rod is rotatable by the shaft 17 and is shiftable on this shaft in longitudinal direction as indicated in Fig. 1. The driving rod 14 may be raised or lowered for varying the charge or for reversing the engine and for this purpose a lever 19 serves, which is oscillatably mounted at 18. This engages with an annular groove 20 of rod 14.

The driving rod 14 is guided in a stuffing box 21 of the valve casing.

The operation is as follows:—

When driving fluid flows into the slide valve body 1 from the fluid supply tube 22, the slide valve body 1 is pressed in outward direction radially on its seat so that the steam cannot flow over into all the steam channels 8—13. Steam is admitted only to the channels and consequently to the cylinders 23 which register with the corresponding port in the slide valve body 1. Owing to the revolution of the engine which is thus started and owing to the rotation of the slide valve body resulting therefrom fluid is necessarily admitted to the channels and cylinders in accordance with the adjusting of the slide valve body, all the other channels being tightly shut off from the fluid admission by the radial pressure exerted by the fresh fluid upon the slide valve body. To alter the charge or to reverse the engine the slide valve body has to be shifted in vertical direction with the aid of lever 19. The direction of rotation corresponding with the two ports 3, 4 in the slide valve body 1 are indicated in Figure 5 by arrows. The upper and lower edges of the rotary slide valve body 1 are preferably rounded or broken away to avoid that after long use these edges cut grooves into the valve seat which might impede the shifting of the valve body in vertical direction.

The rotary slide valve gear according to the invention is adapted to control a number of cylinders by a single admission element, all the expensive mechanisms hitherto required, such as rolling levers, cams and pushers being omitted, the driving rod being guided absolutely air tight and working without any noise. The arrangement shown in Fig. 1 is adapted to be tested with the aid of the fresh steam pipe by rotating the driving rod 14 without the aid of the engine.

24 are the pistons and 25 the exhaust ports in the cylinders 23.

I claim:—

1. A rotary slide valve mechanism for a multi-cylinder engine comprising in combination a cylindrical valve seat having fluid distributing channels at circumferentially spaced intervals to the several cylinders and adapted to receive driving fluid, a slide valve body in said seat, said body consisting of an eccentrically bored hollow cylinder slit in longitudinal direction at its thinnest element, said valve body having two ports of relatively different size and shape extending for some distance circumferentially out of opposite sides of the longitudinal slit and spaced from one another longitudinally of the valve body, a valve stem at the axis of the valve body adapted to longitudinally position and to rotate the valve, means rotated by the engine for rotating the stem and other means for longitudinally shifting said stem in order to shift the valve body so as to bring the one or other of said ports during rotation of the valve into successive registry with said distributing channels.

2. In inlet valve mechanism for a multi-cylinder engine, a cylindrical casing adapted to receive driving fluid, an eccentrically hollow cylinder valve therein longitudinally slit along its thinnest element presenting an open end to the driving fluid and having an outlet port for a considerable portion of the length of the slit extending in a circumferential direction out of the slit, the width of the port progressively increasing along its length, channels between the casing and the several cylinders of the engine having open ends at circumferentially spaced intervals around the interior of the casing, the dimensions of said open ends in a direction longitudinal of the valve being short as compared to the length of the said port, means for rotating the valve by the operation of the engine and other means for longitudinally changing the position of the valve in its casing without affecting the operative connection between the engine and the valve, different portions of the length of the port registering successively with said open ends according to the longitudinal setting of the valve.

3. In a rotary inlet valve mechanism of a multi-cylinder engine, a valve casing, an eccentrically bored cylinder valve member therein having ports adapted for engagement with longitudinal movement of the valve element and longitudinally slit along its thinnest part and a rotatable control member therefor loosely engaging the valve member at its thickest part and longitudinally positioning the valve member with respect to the cylinder.

In testimony whereof I affix my signature.

FREDERICK WASHINGTON ELLYSON.